United States Patent [19]

Babich

[11] Patent Number: 4,990,166
[45] Date of Patent: Feb. 5, 1991

[54] GAS STREAM PURIFYING EQUIPMENT

[76] Inventor: William F. Babich, 419 Franklin St., East Pittsburgh, Pa. 15112

[21] Appl. No.: 363,626

[22] Filed: Jun. 8, 1989

[51] Int. Cl.$^5$ .............................................. B01D 47/06
[52] U.S. Cl. ...................................... 55/228; 55/237; 55/256; 261/87
[58] Field of Search ................... 55/228, 237, 256; 261/87, 93

[56] References Cited

U.S. PATENT DOCUMENTS

| 442,112 | 12/1890 | Elliott | 261/87 X |
|---|---|---|---|
| 616,997 | 1/1899 | Whitney | |
| 1,110,035 | 9/1914 | Baskervill, Jr. | 261/93 X |
| 1,250,938 | 12/1917 | Allen | 261/93 |
| 1,502,004 | 7/1924 | Akins et al. | |
| 1,526,596 | 2/1925 | Greenawalt | |
| 1,713,046 | 5/1929 | MacIntosh | 261/93 |
| 2,559,164 | 7/1951 | McAllister | 261/87 |
| 3,108,146 | 10/1963 | Gross | 261/93 X |
| 3,123,652 | 3/1964 | Gross | 261/93 X |
| 3,648,441 | 3/1972 | Soria et al. | 261/87 X |
| 3,733,788 | 5/1973 | Crowley | 55/228 |
| 4,749,473 | 6/1988 | Shioiri et al. | 261/87 X |

FOREIGN PATENT DOCUMENTS

| 742856 | 12/1943 | Fed. Rep. of Germany | 261/87 |
|---|---|---|---|
| 1940642 | 12/1971 | Fed. Rep. of Germany | |
| 52-022953 | 6/1977 | Japan | 55/256 |
| 55-067317 | 5/1980 | Japan | 55/256 |
| 59-160516 | 9/1984 | Japan | 261/87 |
| 59-203693 | 11/1984 | Japan | 261/87 |
| 63-016034 | 1/1988 | Japan | 261/87 |

Primary Examiner—Robert Spitzer
Attorney, Agent, or Firm—Clifford A. Poff

[57] ABSTRACT

Apparatus for purifying a gas stream such as air laden with particulate matter and containing unwanted contaminant gases. A bladed rotor supporting a perforated tube therein is positioned near the bottom of a water column and is revolved at critically high speed, such as over 600 revolutions per minute while a gas-stream inlet communicates with the interior of the rotor via the perforated tube. At the critical rotational speed water from the water column is prevented from entering between the blades of the rotor, the rotation of which draws contaminant inlet gas thereto through the perforated tube. The gas stream drawn into the rotor through the perforated tube is thereafter expelled by centrifugal force from the blades of the rotor into the water column thus affording cleaning of the gas stream by the water in the column. Water from the column is preferably withdrawn and prepared for reuse, as by filtering, neutralizing, pumping and, if necessary, cooling.

13 Claims, 11 Drawing Sheets

GAS STREAM PURIFYING EQUIPMENT

BACKGROUND OF THE INVENTION

1. Field of the Invention

This invention relates to apparatus for cleaning gas streams that contain unwanted contaminants, such as particulate matter and unwanted gases, and in particular, it relates to an air-cleaning apparatus that is capable of removing not only dust and smoke but also such gases as carbon dioxide, sulphur dioxide, nitrous oxide, and nitric oxide. The invention has a method aspect, in the use of the apparatus for the purpose set forth herein.

2. Description of the Prior Art

Many different methods and kinds of equipment for air-pollution control are known. There are the intertidal separators, such as cyclones, the scrubbers and washers, including spray chambers, atomizing scrubbers, deflector washers, mechanical scrubbers and spray nozzles. There are the fabric collectors, including cloth filters and complete baghouses. Also known are the electrostatic precipitators, sonic precipitators, settling chambers, catalytic equipment, direct-flame fume incinerators, liquid-waste incinerators, solid-waste incinerators, gaseous-waste incinerators, trash compactors, fans and blowers, gas-absorption equipment, gas-adsorption equipment, and odor counter-actants and destructors. It is also known to separate solid particles and unwanted gases from a gas stream with the use of a liquid filter comprising a high column of water or the like. The implementation of such a system, however, has been limited due to the high gas stream inlet pressures required to operate such systems as well as the relative ineffectiveness of conventional machinery to generate the necessary pressure to render such systems cost effective and efficient. An advantage exists, therefore, for a gas stream purifying apparatus which uses a high column of water as a liquid filter and which efficiently produces the high gas stream inlet pressures required to operate such an apparatus.

It is therefore an object of the invention to provide an improved gas stream purifying apparatus which uses a high column of water as a liquid filter.

It is a further object of the invention to provide apparatus for efficiently and economically producing the high gas stream inlet pressures required for gas stream purifying devices which use a high column of water as a liquid filter.

Still other objects and advantages will become apparent when one considers the drawings and the description of the invention presented hereinbelow.

SUMMARY OF THE INVENTION

This invention relates to apparatus for purifying a gas stream, such as air laden with particulate matter and containing unwanted contaminant gases. A bladed rotor supporting a perforated tube therein is positioned near the bottom of a water column and is revolved at critically high speed, such as over 600 revolutions per minute while a gas-stream inlet communicates with the interior of the rotor via the perforated tube. At the critical rotational speed water from the water column is prevented from entering between the blades of rotor, the rotation of which draws contaminant inlet gas thereto through said perforated tube. The gas stream drawn into the rotor through the perforated tube is thereafter expelled by centrifugal force from the blades of the rotor into the water column thus affording cleaning of the gas stream by the water in the column. Water from the column is preferably withdrawn and prepared for reuse, as by filtering, neutralizing, pumping and, if necessary, cooling.

DETAILED DESCRIPTION OF THE PREFERRED EMBODIMENTS

Figure 1:
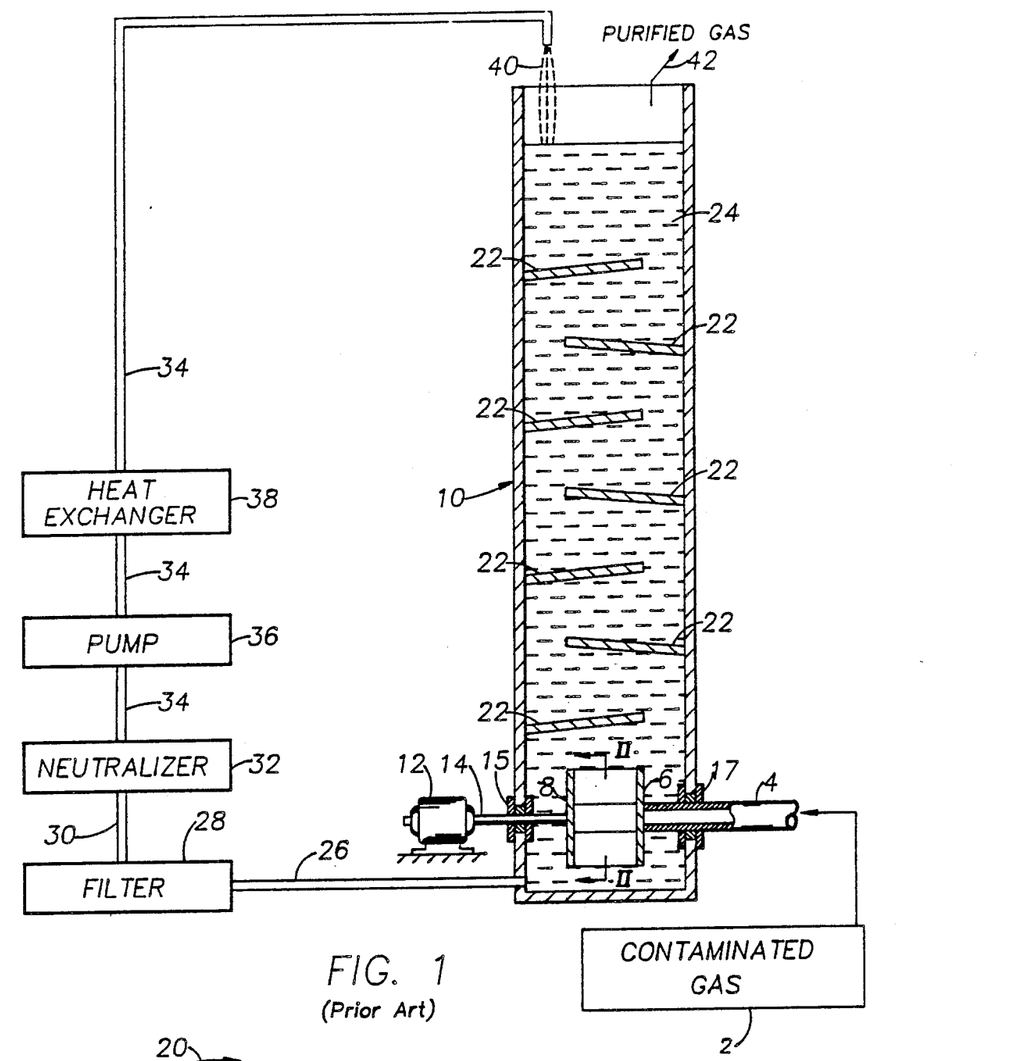
FIG. 1 is a schematic illustration of prior art gas stream purifying equipment using a high column of water as a liquid filter.

In FIG. 1 there is shown a prior art gas stream purifying device which uses a liquid filter comprising a high column of water or the like in order to purify the gas stream. Such a device is disclosed in German Patentschrift 1,940,642 and is a type of device over which the present invention represents a significant improvement.

As can be seen in FIG. 1, contaminated gas from a source 2 is conducted by means of a intake line 4 into the central space 6 of a bladed rotor member 8 that is set within and near the bottom of a tank 10 that comprises a suitable column of substantial height of water or the like. A motor 12 acts through a shaft 14 to cause rotation of the rotor 8. Appropriate seals 15 and 17 are positioned between the walls of tank 10 and the shaft 14 and line 4, respectively.

Figure 2:
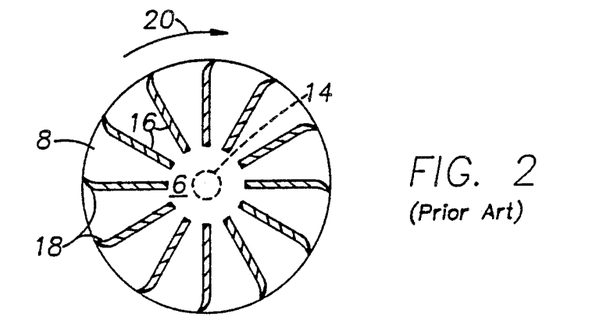
FIG. 2 is a view taken along line II—II of FIG. 1.

Referring to FIG. 2, one can see that the rotor 8 has, radially exteriorly of its central space 6, a plurality of blade members 16, which preferably have curved portions 18 that turn in the direction indicated by the arrow 20. The arrow 20 also indicates the direction of intended rotation of the rotor member 8.

Returning to FIG. 1, the tank 10 comprises a plurality of baffle members 22 that, will be appreciated, serve to prolong the period of contact between gas emanating from the rotor 8 and the liquid 24 that is contained within the tank 10. As shown, the baffles 22 are preferably slanted somewhat upwardly near the center of the tank 10, to prevent gas from becoming trapped thereunder.

Preferably, the equipment of the invention includes a line 26 leading from the bottom of the tank 10 to a filter means 28, from which liquid is withdrawn through a line 30, leading to a neutralizer 32. Liquid is withdrawn from the neutralizer 32 by means of a line 34 containing a pump 36 and, if desired or necessary, a heat exchanger 38. The line 34 then communicates with the top of the tank 10, as indicated at 40.

OPERATION

The apparatus described above is operated in the following manner. The motor 12 is caused to revolve at such a rate as to turn the rotor 8 at a suitably high speed, such as about 600 revolutions per minute or more. It is essential that the rotor 8 be revolved sufficiently rapidly that water is prevented from entering the spaces between the blades 16. Rotation of the rotor 8 has an aspirating effect upon the contaminated gas in the line 4, drawing it into the space 6 and thence through the spaces between blades 16 and ultimately into the liquid 24 in the tank 10, with the contaminated gas entering the liquid 24 being in the form of small bubbles Any dust particles in the contaminated gas in the line 4 are, of course, also ejected by the rotor 8 into the liquid 24.

Although for most purposes it may prove satisfactory to use water for the liquid 24 in the tank 10, it will be apparent that in acidic or alkaline substance of suitable nature may be dissolved in the water in order to promote the removal of alkaline or acidic gases, respectively, from the contaminated gas stream. For example, if the contaminated gas contains sulphur dioxide, nitrous oxide or any of a great number of other possible contaminants that when hydrolyzed in water tend to produce acids, it will be advantageous to add to the water a small quantity of a suitable alkali, such as potassium hydroxide, or a salt that hydrolyses basic, such as sodium bicarbonates. If, on the other hand, the contaminated gas stream contains as a contaminant sodium vapor or ammonia, it will be preferable to add to the water a substance that is acidic or hydrolyses acidic, such as sulfuric acid or ferric chloride. It is also possible to envision instances in which the liquid 24 is something other than water. One example is the use of monoethanolamine to eliminate carbon dioxide from a stream of reducing gas comprising a mixture of CO and $H_2$ (see U.S. Pat. No. 2,752,234).

The prior art device of FIG. 1 operates in such a manner that the gas to be cleaned is actually drawn by suction from the line 4 into the space 6 and then impelled outwardly by the blades 16 of the rotor 8. The small bubbles of gas emanating from the rotor 8 then ascend by buoyant force through the tank 10, with their time of contact with the liquid 24 being prolonged to any extent necessary or desired by the action of the various baffles 22.

With the apparatus of the type depicted in FIG. 1, it is important that the contaminated gas that is to be cleaned be insoluble, or substantially so, in the water or other liquid 24. Beyond that, there is virtually no limitation. Although it is apparent that such a device is most likely to be of use in cleaning air of smoke, dust, and noxious gases such as sulphur trioxide, it is apparent that the apparatus could also be used for stripping ammonia from synthesis gas or removing particulate matter from blast furnace off-gas that is intended subsequently to be recovered for its fuel value.

It is to be appreciated that with the device of FIG. 1 and also with that of the present invention, it will be possible to replace the water or other liquid 24 on a batchwise basis. Preferably, however, this is avoided because it necessitates shutdown of the equipment. Instead, it is preferable constantly to clean up and recirculate the liquid 24, using for this purpose the additional equipment, or certain elements thereof, shown in FIG. 1. To be more specific, water may be withdrawn through the line 26 and freed of solid contaminants in a suitable filter 28 or other solids-removal means, such as a settling tank. Effluent therefrom is preferably neutralized in a neutralizer 32 before being led by the line 34 to the pump 36. It is important that the pump 36 be located downstream of the solids-removal means 28 and the neutralizer 32, to minimize corrosion and wear on the pump 36.

In many instances, the heat exchanger 38 will not be necessary, but in some instances, it occurs that it is desirable to adjust the temperature upward or downward before permitting the liquid to return to the tank 10 as at 40.

Although the pH of the liquid may be adjusted satisfactorily in the neutralizer if an acidic or basic solution is being used in the tank 10, it will be preferable in most instances to operate the neutralizer 32 to adjust the pH of the liquid to approximate neutrality, i.e., to the vicinity of 7, adding any required make-up substance to the top of the tank 10, so as to avoid the corrosion of the pump 36 that will ordinarily take place if it operates upon a liquid that is significantly acidic or basic.

As a result of the operation described above, there is produced a purified gas stream that leaves the top of the tank 10 as indicated at 42.

The device depicted in FIG. 1 and, as will become apparent, the device of the present invention both operate upon a principle of causing a rotating member that has its exterior periphery in contact with a portion of the lower region of a high column of liquid to be revolved at a rate of speed sufficiently high to produce in the liquid an effective cavity, from which the incoming gas stream to be purified emerges in a finely divided state, with the rotating member being of such nature as to lend to the gas stream to be purified the centrifugal force required to enable it to leave the rotating member and enter the liquid in the tank whereby the gas stream is then purified through contact with the liquid.

The required speed of rotation of the rotating member illustrated in the prior art device of FIG. 1 and that of the present invention is chosen with appropriate consideration being given to the nature of the rotating member and the viscosity of the liquid in the tank. With only a few blades on the rotor member, or a rotor member of small diameter, or with a liquid of low viscosity, it may prove necessary to use a rotational velocity substantially greater than the value of 600 revolutions per minute mentioned above, whereas with a greater number of blades, or a rotor member of larger diameter, or with a more viscous liquid medium, slower speeds may be used.

The prior art device of FIG. 1 has been useful in purifying relatively low-volume gas streams which pass through liquid columns of relatively limited height. However, such a device is ineffective and virtually unadaptable to large commercial and/or industrial applications in which a column of liquid of substantial height is required to properly filter large quantities of contaminants from high-volume gas streams. At the present, such devices require extremely high-powered and cost-ineffective motors in order to turn the rotor against the force of the elevation head of the liquid and to create the significant suction on the incoming gas which would overcome the force exerted thereagainst by the elevation head of the liquid.

The present invention, as will be seen, provides a unique system for greatly enhancing the suction power of the rotor while using a relatively low-powered and more economical motor. The apparatus of the present invention thus provides an inexpensive yet practical means for producing the substantial incoming gas pressure required for overcoming the elevation head of tall columns of liquid found in large-scale commercial or industrial liquid-filter gas stream purifying devices. And, when constructed in accordance with the present invention, such liquid filter devices become economically feasible and viable alternatives for purifying vast quantities of gas in large scale commercial or industrial environments.

Figure 3:
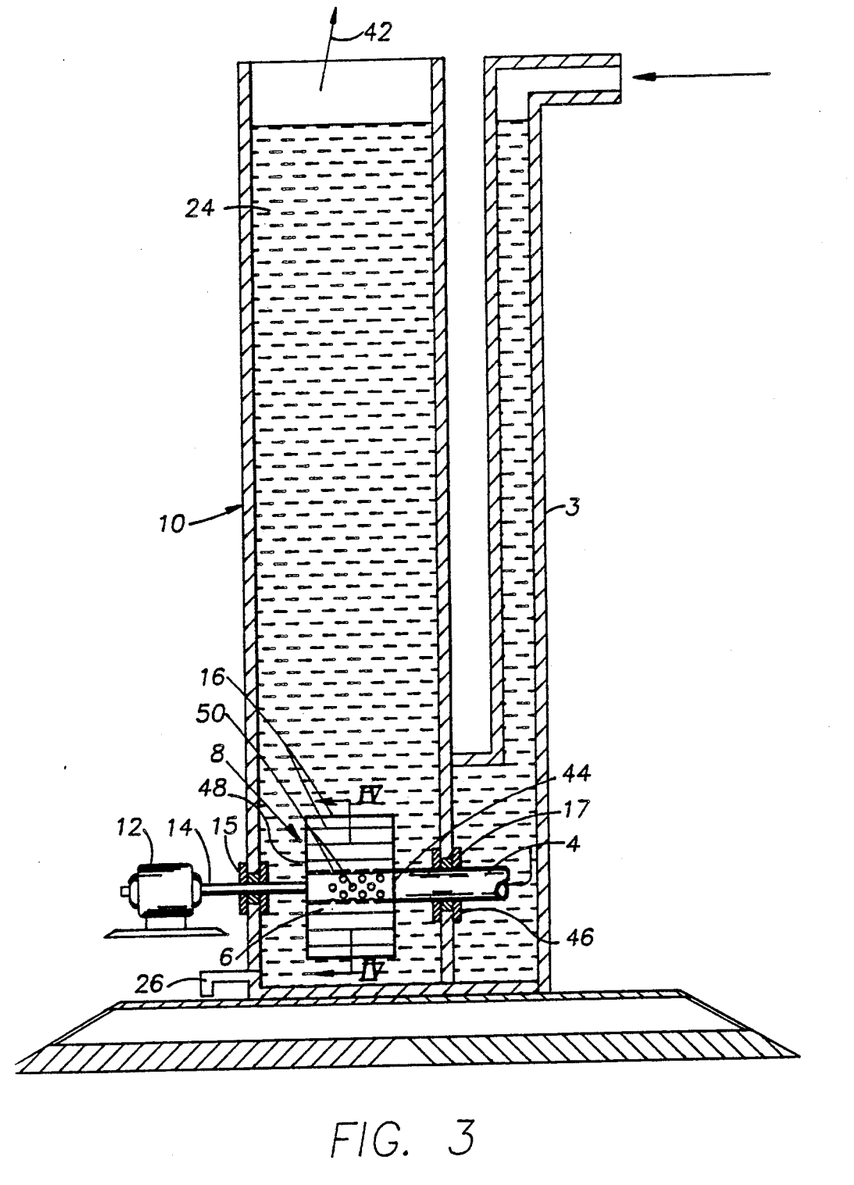
FIG. 3 is a schematic illustration of the gas stream purifying equipment of the present invention in an inoperative mode.
Figure 4:
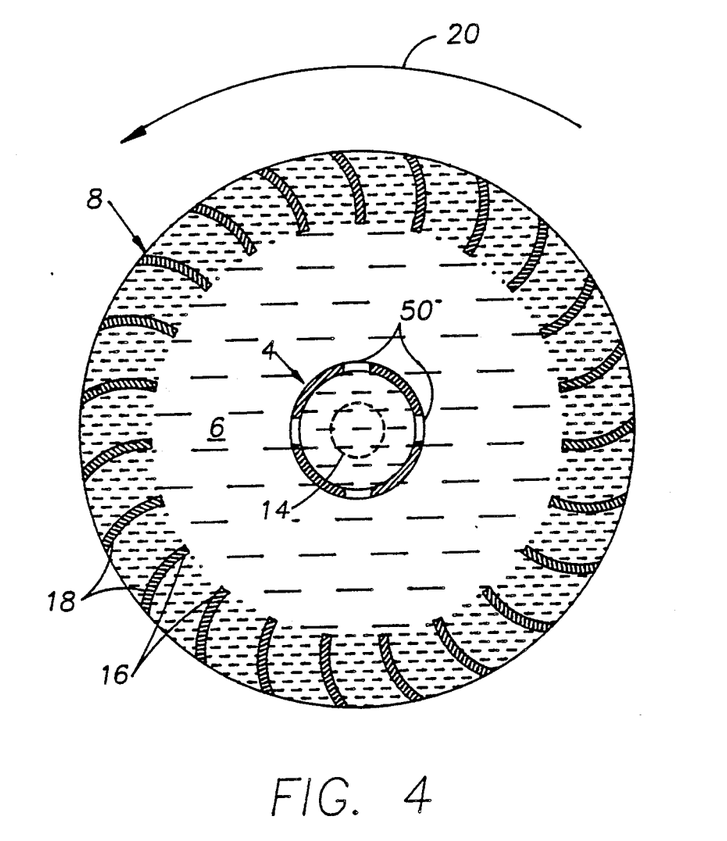
FIG. 4 is a view taken along line IV—IV of FIG. 3.
Figure 5:
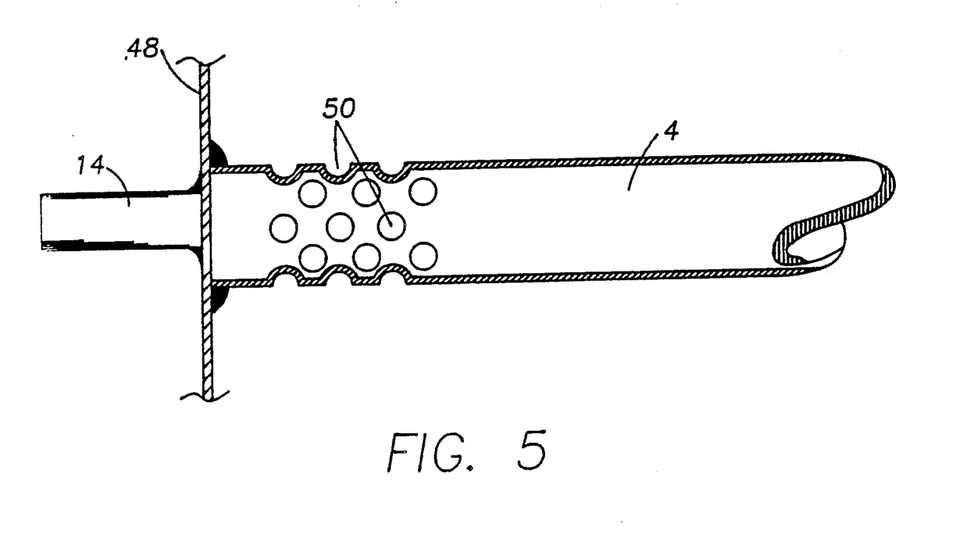
FIG. 5 is an enlarged view of the perforated shaft illustrated in FIG. 3.

Referring now to FIG. 3, where like references indicate similar elements, as is true in the remaining views, there is depicted gas stream purifying equipment constructed in accordance with the present invention. Those elements whose functions have been discussed in great detail hereinabove with regard to the prior art device of FIG. 1 will not be further elaborated upon hereinbelow except when such elaboration becomes necessary for presenting the full and proper description of the present invention.

In FIG. 3, just as in FIG. 1, when motor 12 rotates shaft 14, the rotor 8 also is caused to rotate. As in the prior art device of FIG. 1, when the critical speed is reached, contaminated gas begins to enter the rotor 8 and be expelled therefrom by centrifugal force through the spaces between the blades 16 of the rotor. Radially outer ends 18 of the blades 16, as with the prior art device of FIG. 1, are preferably curved in the direction of rotation of the rotor since such curvature produces an increased efficiency in the rotor operation.

Revolution of the rotor 8 first causes standing liquid and then contaminated gas to be drawn downwardly through a pollution intake stack 3, and thereafter into an inlet opening at a first end of intake line 4. Intake line 4 passes through and is welded about its outer periphery to opening 44 in a first disk-like sidewall 46 of rotor 8. The intake line 4 extends completely through the axial center of the rotor and is welded about its outer periphery at a second end thereof to a second disk-like sidewall 46 in rotor 8. By this construction the intake line 4 is caused to rotate in unison with the rotor 8.

Contaminated gas which is drawn through the intake line 4 is permitted to pass into the interior space of the rotor 8 through a plurality of apertures 50 formed in the portion of the intake line 4 located between the disk-like sidewalls 46 and 48 of rotor 8. The apertures 50, while shown as being circular, can be of any suitable shape. Still further, the number of apertures provided in the intake line 4 can be varied as desired. Also, it is preferred that the apertures 50 in the intake line be uniformly spaced therealong so as to equally distribute the contaminated gases throughout the interior volume of the rotor. In contrast, the intake line of the prior art device of FIG. 1 terminated at a first sidewall of the rotor and the contaminated gas drawn in through the intake line tended to concentrate in the rotor at the first sidewall and was not uniformly distributed throughout the interior thereof.

Concentration of the contaminated gas at such a limited location disadvantageously reduced the area in which the contaminated gas was expelled into the liquid column. The limited area of contact between the contaminated gas and the liquid upon expulsion of the gas from the rotor accordingly hindered the usefulness and efficiency of the liquid as a filter medium.

Of no less importance, the apertures 50 further serve as orifice constricting means for enhancing the suction capabilities of the rotor. The total area of the apertures 50 is designed to be less then the cross sectional area of the intake line 4. From observation it has been determined that the most beneficial suction effects are created when the total area of the apertures 50 is on the order of 30-50%, and preferably about 40%, of the cross-sectional area of the intake line 4. It has been further discovered that stress on the motor is virtually unchanged under such "constricted orifice" conditions. However, if the total area of the apertures is below approximately 30% of the cross-sectional area of the intake line, the suction capabilities of the rotor are actually negatively affected. In other words, a motor turning the prior art rotor of FIG. 1 at a given speed would create more suction than a "constricted orifice" rotor rotating at the same speed and having a combined aperture area of less than 30% of the cross-sectional area of the intake line. Therefore, a higher powered motor capable of producing and maintaining speeds higher than those produced by the motor of the prior art device would be needed to operate a "constricted orifice" rotor having a total aperture area less than 30% of the intake line cross-sectional area just to maintain the suction efficiency of the rotor at the level of the prior art rotor depicted in FIG. 1.

On the other hand, if the total aperture area is greater than approximately 50% of the cross-sectional area of the intake line, then little to no benefit, i.e., increased suction, is obtained in the rotor of the present invention over the rotor disclosed in the prior art.

However, it has been observed that considerable benefits in terms of increased suction within the rotor and, hence, volume of gas drawn in by the rotor, are achieved when the aperture area is between 30-50%, and most preferably about 40%, of the cross sectional area of the intake line. In practical terms, the increased suction produced by a "constricted orifice" rotor having a total aperture area between 30%—50% of the cross-sectional area of the intake line permits a motor of the type used in the prior art device to be employed in liquid filter devices having higher liquid columns and, therefore, increased filtering capacity without additional stress being placed on the motor.

Figure 7:
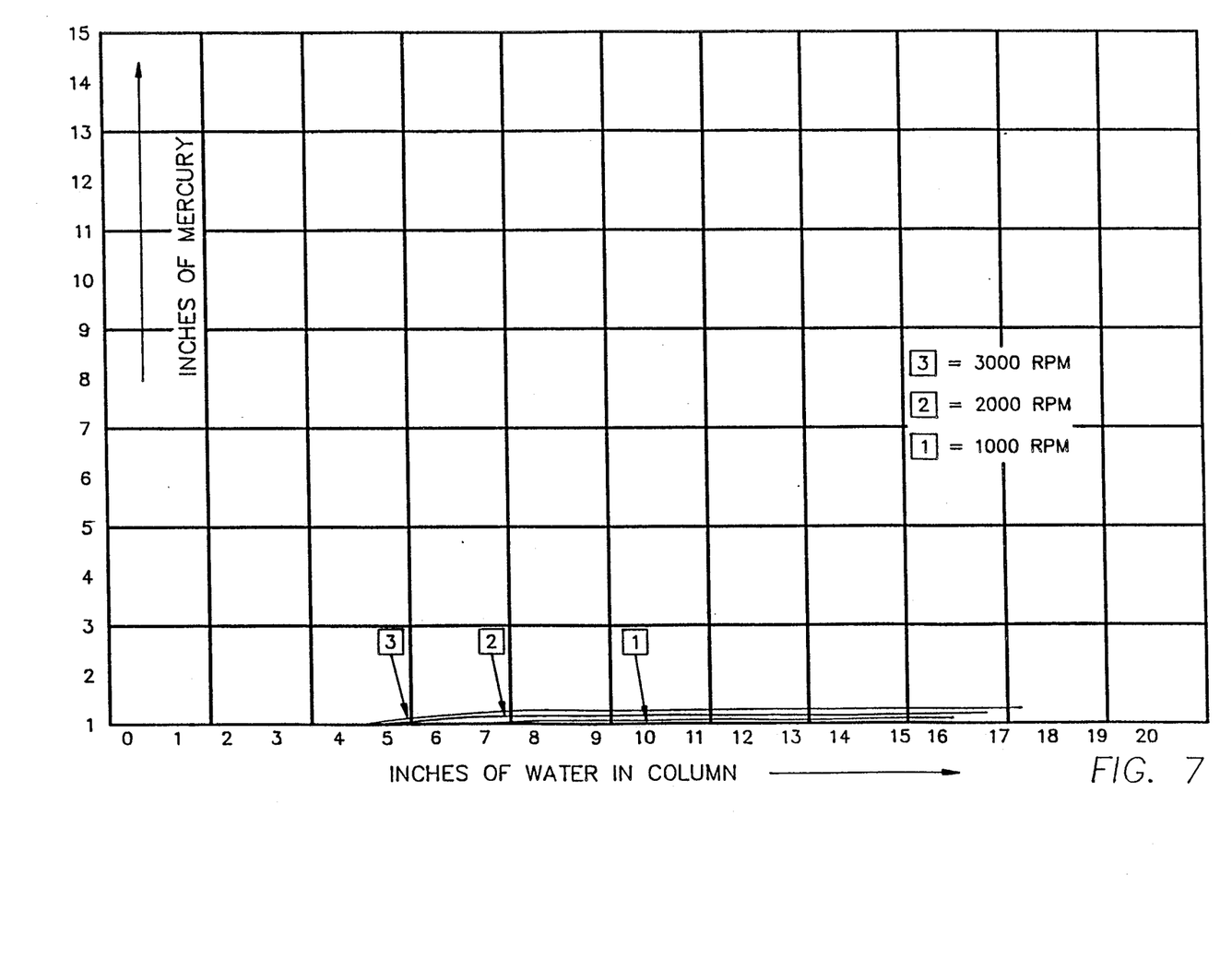
FIGS. 7–9 are graphical illustrations of various performance data of the prior art gas stream purifying equipment illustrated in FIG. 1.
Figure 8:
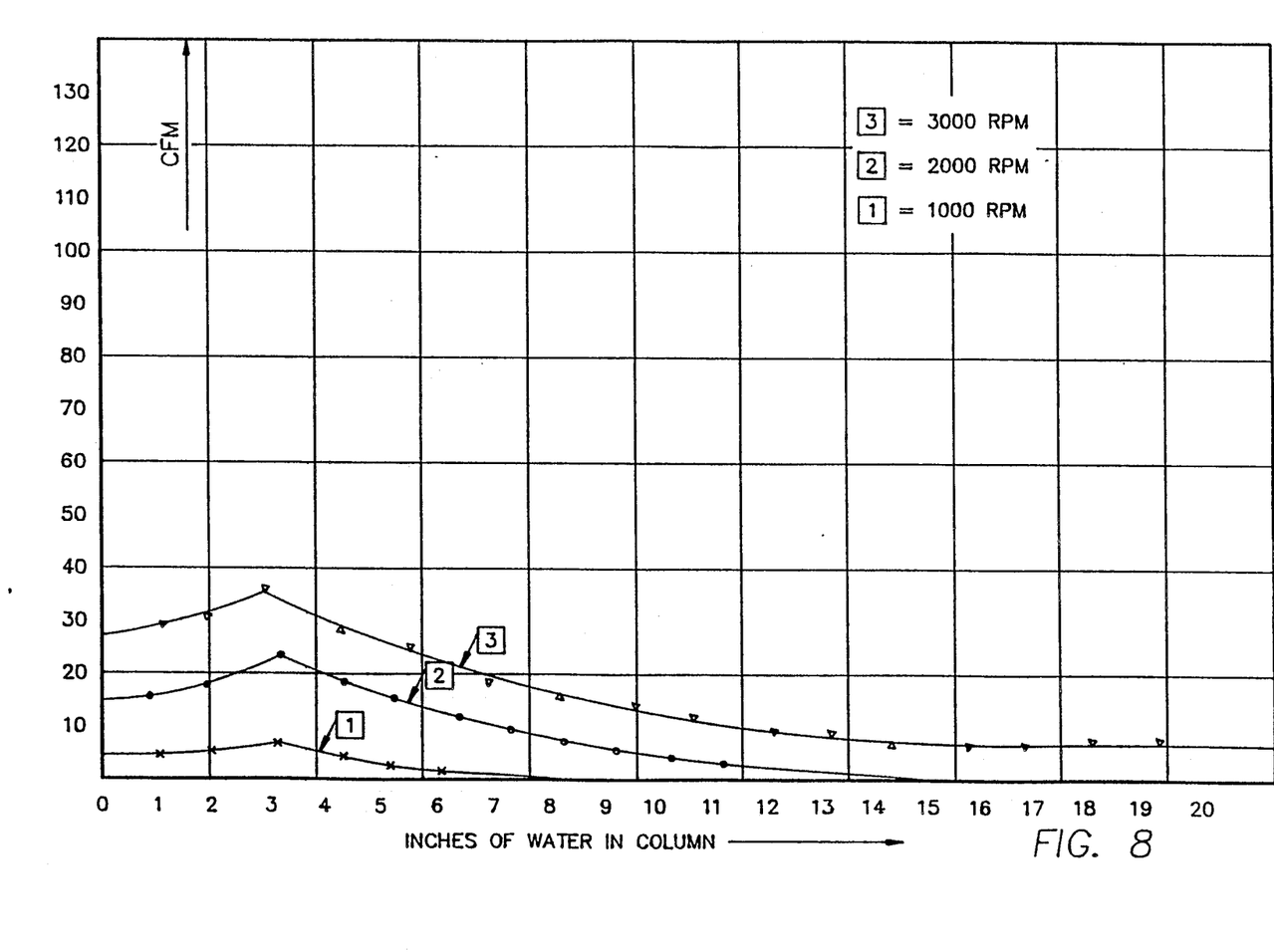
Figure 9:
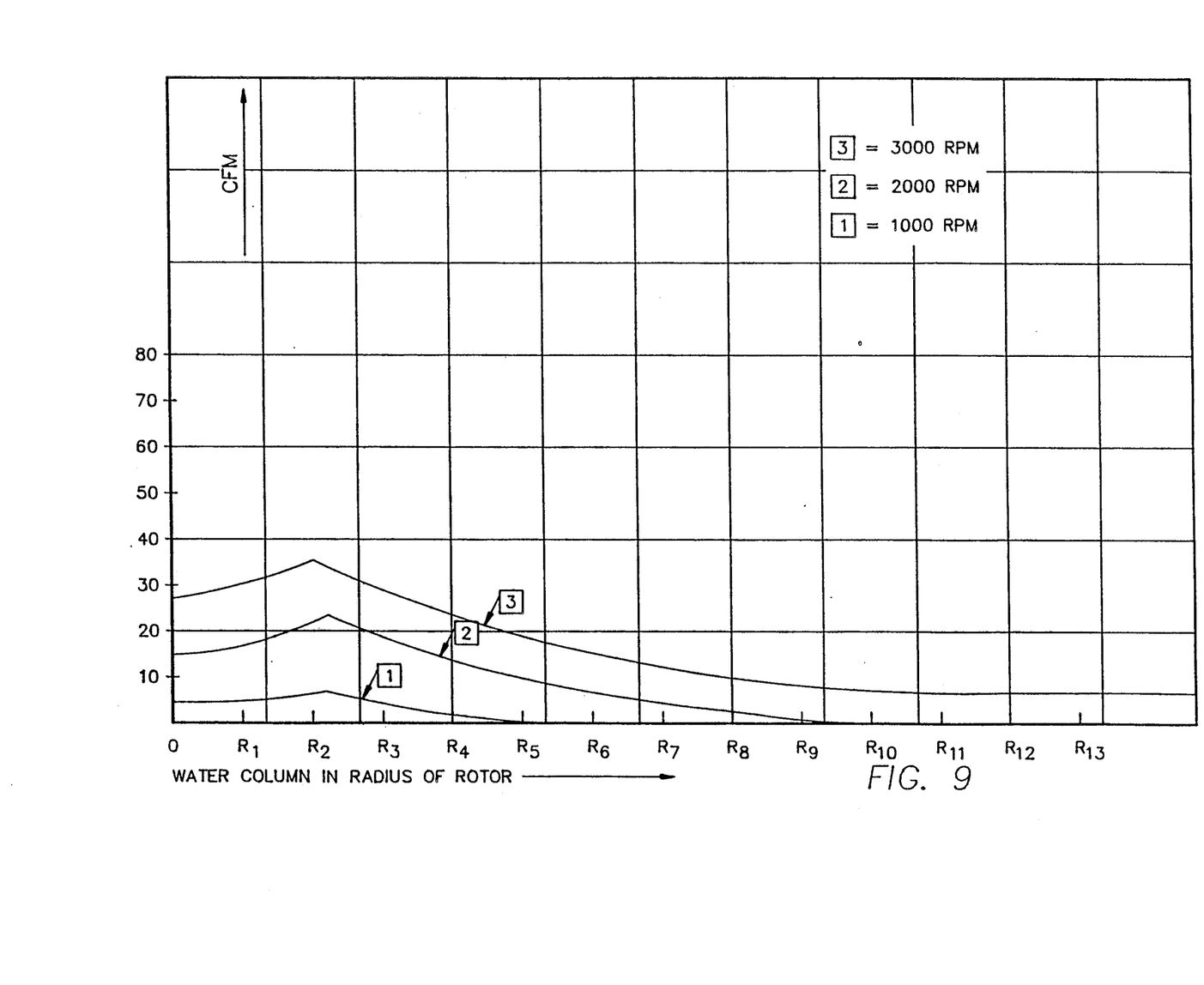

FIGS. 7-9 and 10-12 graphically illustrate the performance of a model of a rotor and intake shaft constructed in accordance with the present invention (FIGS. 10-12) as compared with a model of an identically-sized rotor constructed in accordance with the prior art (FIGS. 7-9). In each case the outer diameters of the rotors 8 as tested were 3", the inner diameters of the intake lines 4 were 1" and the axial lengths of the blades from sidewall to sidewall of the rotors were 1⅜". The intake shaft 4 constructed in accordance with the present invention included twenty-four ⅛" diameter circular apertures 50 therein The total area of the apertures was approximately 0.29 square inches and the cross-sectional area of the intake shaft was approximately 0.79 square inches. Therefore, the ratio of the total area of apertures 50 to the cross-sectional area of the intake line 4 was 0.29/0.79 or approximately 37%. Both rotors 8 had 35 blades and an outer circumferential surface area of approximately 13 square inches. Both rotors were tested at speeds of 1000, 2000 and 3000 RPM.

Figure 13:
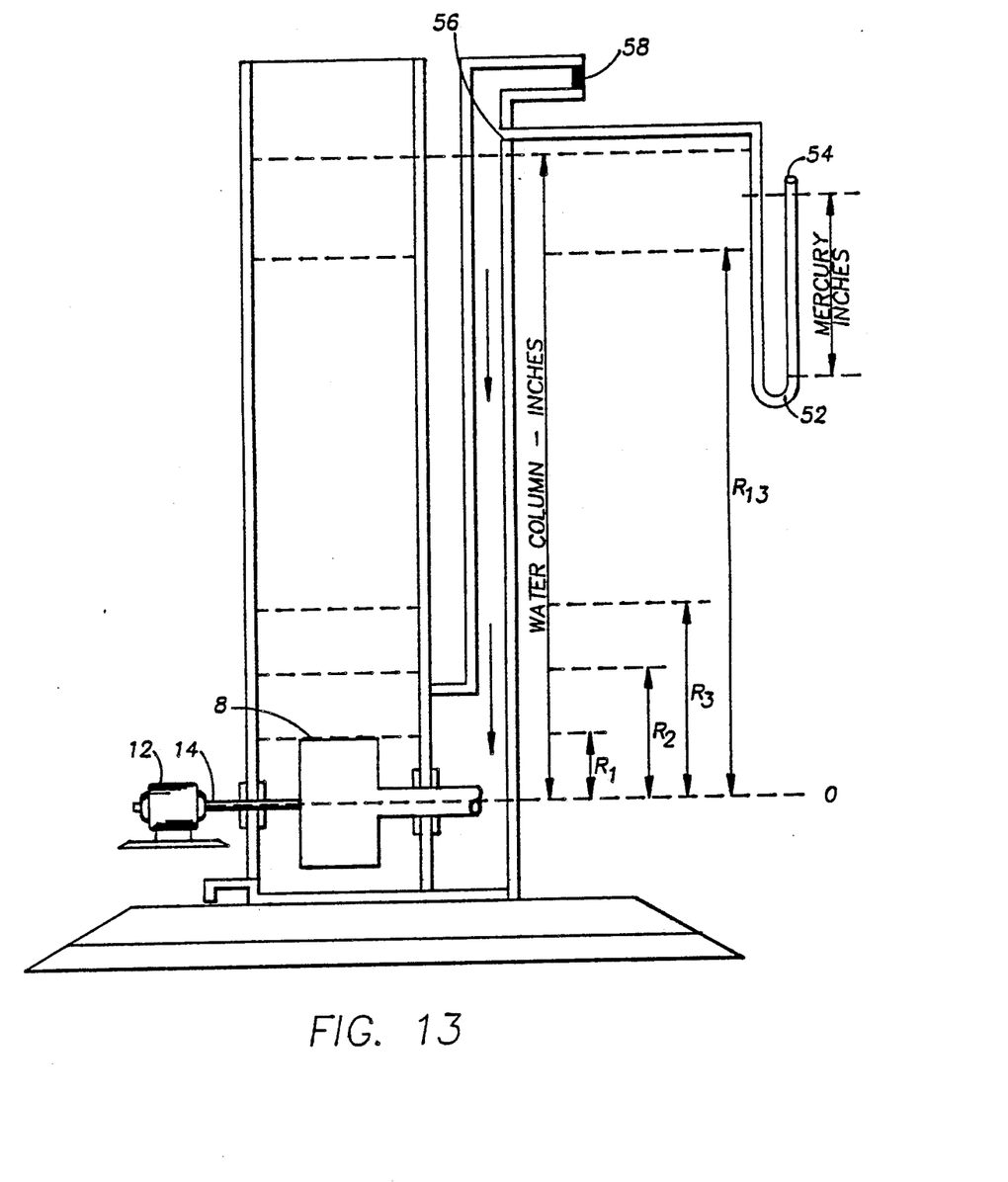
FIG. 13 is schematic illustration representing a structure for testing the pressure of the gas pumped by liquid column gas purifying equipment of the prior art and that of the present invention.

As can be seen in FIG. 13 the gas pressure of the intake stack 3 was measured with a mercury filled manometer 52. One side of the manometer was open to the atmosphere as at 54 while the other side of the manometer was connected at 56 to the interior of the intake stack 3 at an uppermost portion thereof. The uppermost end of the stack 3 was closed with a suitable plug 58 and each of the rotors—which were easily interchangeable in the model structure—were rotated at 1000, 2000 and 3000 RPM, respectively, under various levels of water contained in the liquid column and the intake stack. The water levels chosen for the test were either measured in inches of water or multiples of the radii of the rotors 8 as measured above the centerline of the intake shaft 4. For example, $R_1$ was a water level of one rotor radius above the centerline of the intake shaft, $R_2$ was a water level of two rotor radii above the centerline of the intake shaft, etc. The data obtained by the testing structure shown in FIG. 13 are plotted in FIGS. 7 and 10.

Figure 10:
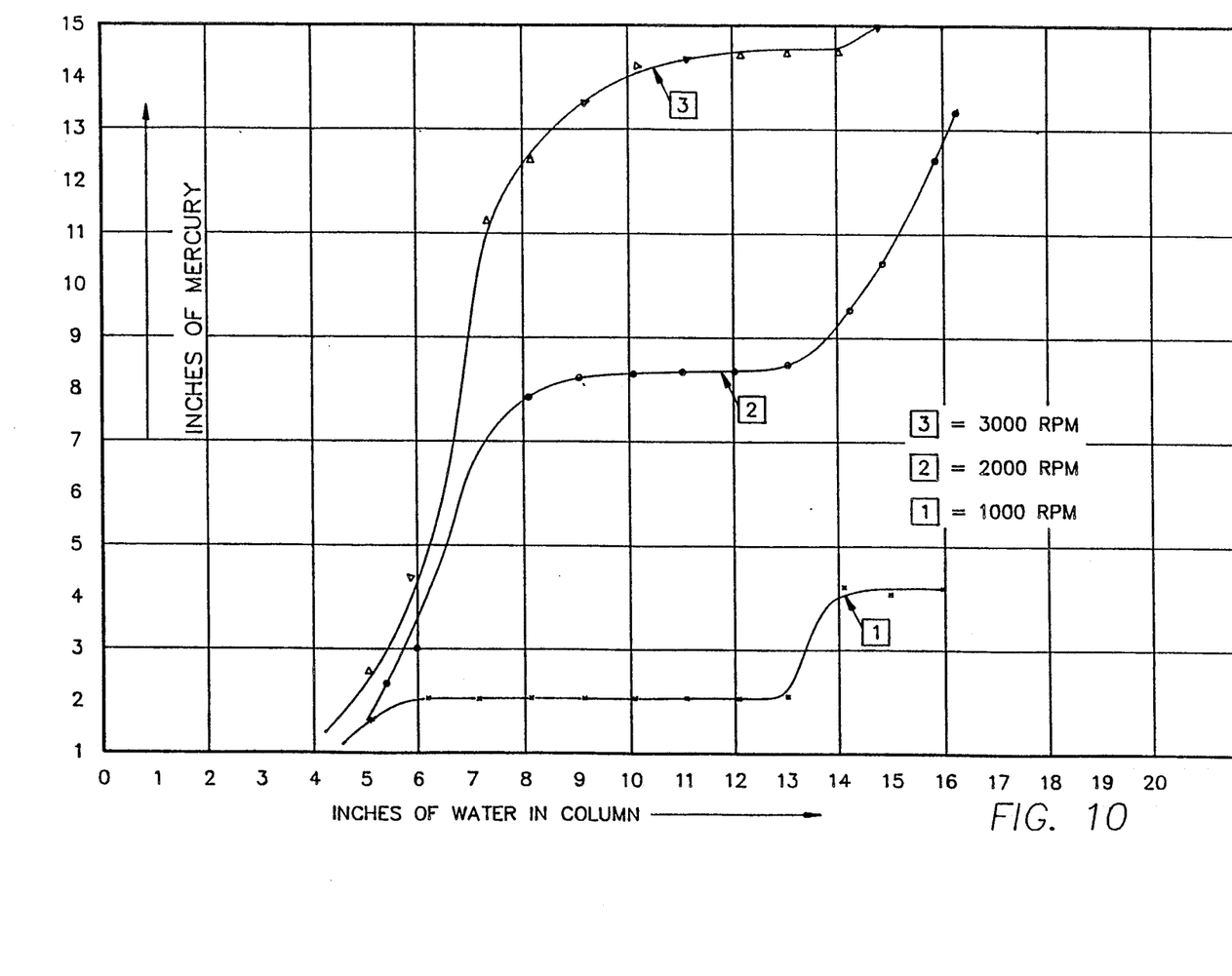
FIGS. 10–12 are graphical illustrations of various performance data of the gas purifying equipment of the present invention.
Figure 11:
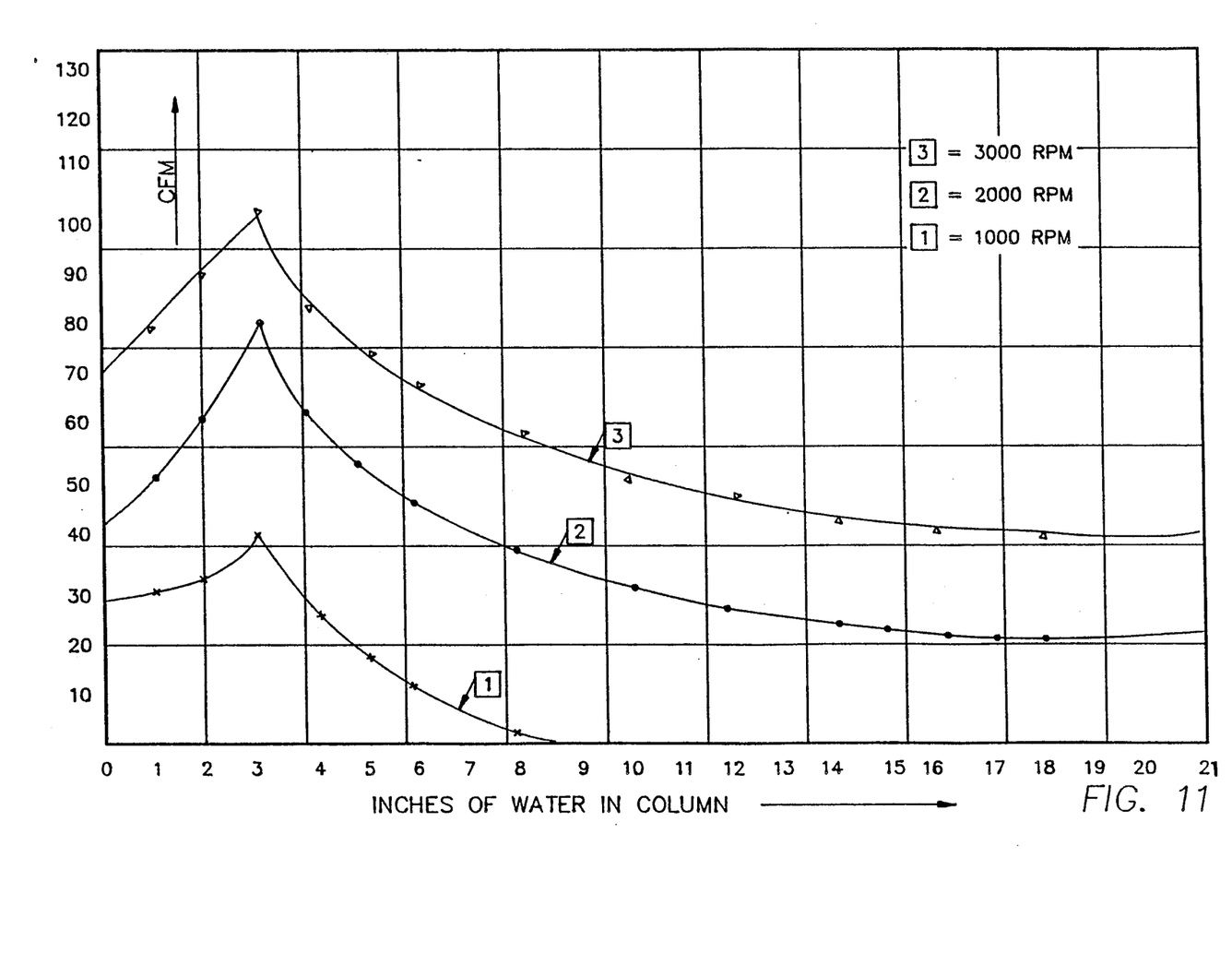
Figure 12:
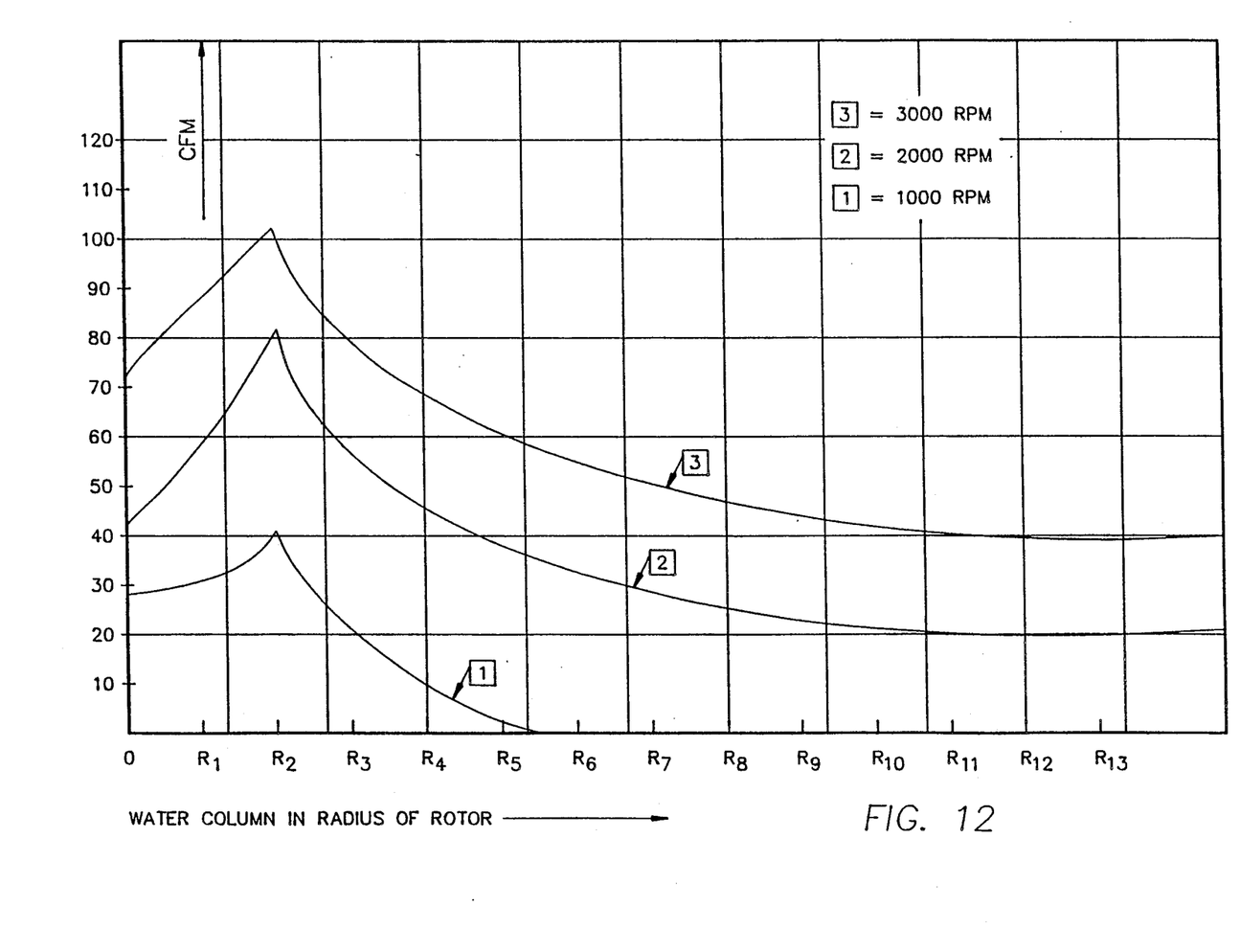

As can be readily seen in the comparison of FIGS. 7 and 10, the suction pressure (in inches of mercury) within the intake stack 3 created by the rotor 8 and perforated intake line 4 of the present invention is at all times significantly higher than the suction pressure created by the simple rotor of the prior art device—regardless of the rotor speed or the height of water within the stack and liquid column.

Similar tests comparing the volume of gas pumped or "drawn in" to the liquid column versus the inches of water in the liquid column (FIGS. 8 and 11), and the volume of gas pumped versus height of water in the liquid column in terms of multiples of rotor radii (FIGS. 9 and 12), produce similar results. It should be noted that a point of maximum pumping efficiency is obtained at a water level of approximately two rotor radii above the centerline of the intake stack regardless of the speed of rotation of the rotor.

From the foregoing, it should be appreciated that the present invention provides a unique yet uncomplicated design for greatly improving the pumping efficiency of gas-pumping rotors used in tall liquid column filtering devices, thus rendering such devices economically feasible and commercially usable as gas stream purifying devices for large scale commercial and/or industrial applications.

Figure 6:
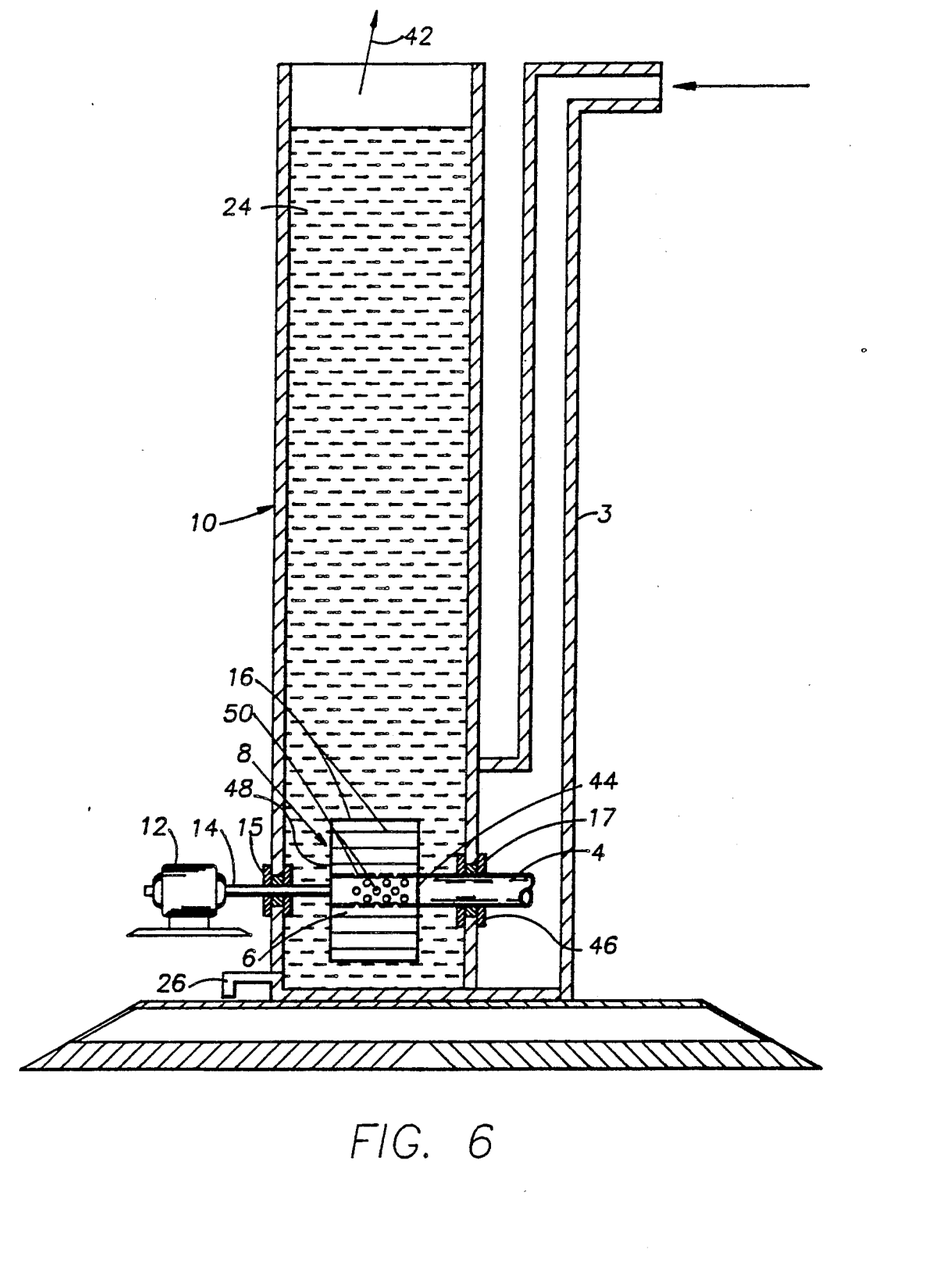
FIG. 6 is schematic illustration of the gas stream purifying equipment of the present invention in an operative mode.

Also, it should be further appreciated that the baffles 22, filter 28, neutralizer 32, pump 36 and heat exchanger 38 were omitted merely for purposes of clarity in the depictions of the present invention illustrated in FIGS. 3 and 6. However, such equipment may be used and, in fact, preferably is used with the gas stream purifying equipment of the present invention.

Furthermore, although not shown, it is contemplated that the perforated tube situated within the central space of the rotor could be replaced with a device which can operate on a venturi principle, if so desired.

While the present invention has been described in accordance with the preferred embodiments of the various figures, it is to be understood that other similar embodiment may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

I claim:

1. Apparatus for purifying a contaminated gas stream by removing particulate matter and contaminant gases therefrom, said apparatus comprising
   tank means of substantial height containing a liquid medium therein;
   rotor means positioned in the vicinity of the bottom portion of said tank means, said rotor means forming a central space interiorly thereof and having a plurality of spaced blade means along the periphery thereof;
   means for causing rotation of said rotor means at a velocity sufficiently high to prevent liquid in said tank means from entering spaces between said blade means, said velocity further being sufficiently high to draw contaminated gas into said central space by suction;
   means for conducting a stream of contaminated gas to said central space; and
   means positioned within said central space for enhancing the suction created by rotation of said rotor means.

2. The apparatus of claim 1 wherein said means for conducting includes a portion extending completely through said central space and said means for enhancing the suction comprise at least one aperture formed in said portion extending completely through said central space.

3. The apparatus of claim 2 wherein the total area of said at least one aperture is less than the cross-sectional area of said means for conducting.

4. The apparatus of claim 3 wherein the total area of said at least one aperture is between about thirty per cent and about fifty per cent of the cross-sectional area of said means for conducting.

5. The apparatus of claim 2 wherein said means for enhancing the suction comprise a plurality of apertures formed in and uniformly spaced along said portion extending completely through said central space.

6. The apparatus of claim 1 wherein said tank means further comprise means located interiorly thereof for delaying the upward passage of gases therein.

7. The apparatus of claim 6 wherein said means located interiorly of said tank for delaying the upward passage of gases therein comprises a plurality of baffle members.

8. The apparatus of claim 7 further comprising means for continuously withdrawing liquid from said tank, treating said liquid, and recirculating said liquid to said tank.

9. The apparatus of claim 8 wherein said means for continuously withdrawing, treating, and recirculating said liquid comprises a solids-removal means and a pump located downstream thereof.

10. The apparatus of claim 9 wherein said solids-removal means comprises a filter.

11. The apparatus of claim 10 wherein said means for continuously withdrawing, treating, and recirculating said liquid further comprises a neutralizer 12. The apparatus of claim 11 wherein said means for continuously withdrawing, treating, and recirculating said liquid to said tank further comprises a heat-exchanger means for adjusting the temperature of liquid that is being returned to said tank.

13. The apparatus of claim 1 wherein radially outer ends of said blade means are curved in the direction of rotation of said rotor means.

* * * * *